(No Model.)

W. H. BACHE & W. W. SMALLEY.
JOURNAL LUBRICATOR.

No. 484,512. Patented Oct. 18, 1892.

WITNESSES

INVENTORS:
Wm. H. Bache.
Wm. W. Smalley.
By Foster & Freeman
Attorneys.

UNITED STATES PATENT OFFICE.

WILLIAM H. BACHE AND WILLIAM W. SMALLEY, OF BOUND BROOK, NEW JERSEY.

JOURNAL-LUBRICATOR.

SPECIFICATION forming part of Letters Patent No. 484,512, dated October 18, 1892.

Application filed March 2, 1891. Serial No. 383,382. (No model.)

*To all whom it may concern:*

Be it known that we, WILLIAM H. BACHE and WILLIAM W. SMALLEY, citizens of the United States, residing at Bound Brook, in the county of Somerset and State of New Jersey, have invented certain new and useful Improvements in Wheel and Journal and Pulley Bearings, of which the following is a specification.

In journal-bearings of various forms which have been made and put into use under Letters Patent granted to W. W. Smalley February 26, 1889, No. 398,547, the bearing-surfaces have been formed partly by the metal faces of the bearing-blocks and partly by lubricating compositions inserted in grooves or recesses formed in the faces of said blocks, so as to make a bearing-face consisting alternately of metal and composition. Such bearings have proved most effective in practice; but it is found desirable in some instances to supply an additional powdered lubricant, which when spread between the journal and the metallic faces of the bearing serves to reduce the friction, heat, and wear of the latter, and which by its adhesion to the composition portion of the bearing tends to compensate for the wear of the latter, thereby maintaining the efficiency of the bearing, increasing its durability and length of wear, and effectually preventing overheating.

Different means may be employed for supplying the powdered lubricant to the bearing, and we will now describe that which we have found effective in practice, reference being had to the accompanying drawings, in which—

Figure 1:
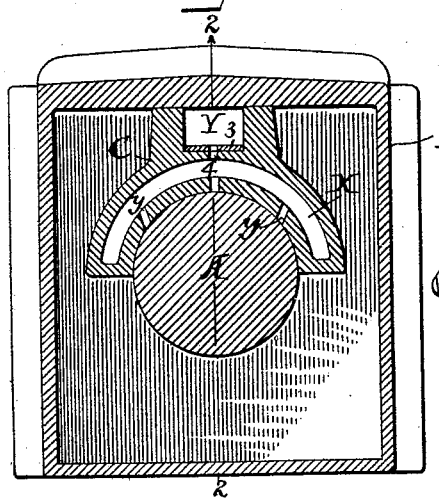
Figure 2:
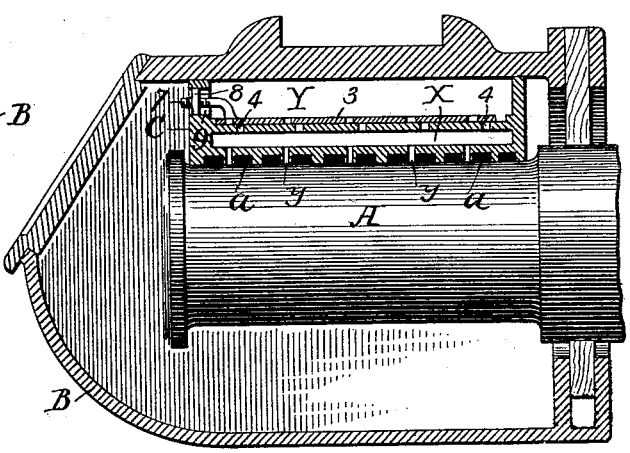
Figure 3:
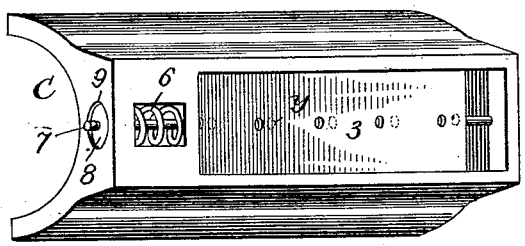

Figure 1 is a transverse section of a car-axle box provided with an antifriction-bearing embodying our invention. Fig. 2 is a longitudinal section on the line 2, Fig. 1. Fig. 3 is a perspective view of one form of bearing detached from the box.

A represents the journal, which may be the journal of a pulley or any revolving shaft or axle, as of a car-axle, Figs. 1 and 2, in which case B is the box, the construction of which will vary according to the character of the journal, the shaft, and the situation in which the parts are used. The bearing C, which also will vary according to the character of the journal-box and situation, is shown in one form of an ordinary bearing-block adapted to the journal A and to fit within the box or hub of a pulley and provided at its inner face with a series of parallel separated grooves or channels *a* for the reception of a plastic or powdered composition of any suitable material—as, for instance, graphite or graphite composition—the grooves or pockets being arranged as set forth in Letters Patent No. 209,084 or in any other suitable manner.

In addition to the features of the journal-bearing thus constructed we make use of a chamber or reservoir containing a supply of powdered lubricant—as, for instance, graphite in a finely-powdered condition—and we perforate the bearing at intervals and so arrange the chamber and perforations that the powder may flow through the perforations from the chamber onto the journal.

The chamber may be formed in the bearing-block or contained within the casing outside of the latter. Thus in the construction shown in Figs. 1 and 2 the block C is cast with an internal chamber X, parallel to the bearing-face, and with perforations *y*, extending through the metallic portion of the bearing, so that a powder placed in the chamber X will flow through the perforations onto the journal. The revolution of the journal will carry the powdered lubricant until it is spread over the entire face of the journal between the latter and metallic bearing-faces, as well as in contact with the bearing-faces of the lubricating composition, whereby the face of the journal is effectively lubricated and held from contact with the face of the metallic portion of the bearing, while the wear of the composition portion is compensated for. The deterioration of the bearing is thus retarded and friction wear and heating greatly reduced.

While the material may flow freely from the chamber to the journal, it is well in some instances to provide means for regulating the flow. Thus a perforated slide 3 with openings which may be brought to coincide more or less with the row of openings *y*, Fig. 1, may be set to different positions, with the openings in the slide more or less overlapping those of the bearing, to regulate the flow through each series of openings from the chamber *x* to the journal, or we may make use of a reservoir Y with a valve of suitable construction for regulating the flow from said reservoir to the chamber $x$, as shown in Fig. 2. In such case there is a series of openings 4 in the partition between the reservoir Y and chamber X, and a valve consisting of a perforated plate, which may be moved to bring the perforations to coincide more or less with the perforations 4, thereby regulating the flow to the chamber X or directly to the journal when the perforations 4 are extended to constitute the perforations $y$.

Inasmuch as a small portion of the powdered lubricant fed at intervals will produce the desired lubricating effect, it will be sufficient in many cases to shift the valve at intervals, so as to bring its openings to coincide with those of the block only for a short time, and we therefore sometimes combine with the slide a spring 6, which tends to hold the slide in position to prevent the flow of lubricant and provide means whereby the slide may be readily moved from outside the box or bearing. Thus the slide may carry a threaded rod 7, upon which turns the button or nut 8, extending into a recess 9 in the bearing-block, but preferably back of the face of the end of the bearing, so that a tool may be readily introduced into the recess 9 and pressed against the button to shift the plate or valve. This construction is especially serviceable when the journal and bearing are in an elevated position, as it permits the valve to be shifted by means of a rod having a finger that can be pressed against the button by a workman on the floor, avoiding the necessity of using a ladder to get access to the parts.

Without limiting ourselves to the precise construction and arrangement of parts shown and described, we claim—

1. A bearing provided with a valve for regulating the passage of the powdered lubricant through openings in the bearing to the journal, a spring for shifting the valve in one direction, and a knob or projection extending to the outside of the bearing, substantially as set forth.

2. A journal-bearing having a series of openings extending to the bearing-face, and with a recess in the outer face for receiving a slide having openings arranged to register with those in the bearings, a spring moving a slide in one direction, and an adjustable button carried by the slide and extending into an opening at the end of the bearing, substantially as described.

In testimony whereof we have signed our names to this specification in the presence of two subscribing witnesses.

WILLIAM H. BACHE.
WILLIAM W. SMALLEY.

Witnesses:
H. G. HERBERT,
R. H. BROKAW.